United States Patent [19]
Greenwood

[11] 3,944,178
[45] Mar. 16, 1976

[54] CABINET SUPPORT STRUCTURE

[75] Inventor: Richard H. Greenwood, Plymouth Meeting, Pa.

[73] Assignee: Aeronutronic Ford Corporation, Blue Bell, Pa.

[22] Filed: Feb. 1, 1974

[21] Appl. No.: 438,566

[52] U.S. Cl.............. 248/226 D; 248/288; 248/214
[51] Int. Cl.² .......................................... A47F 5/00
[58] Field of Search........ 248/289, 288, 126, 226 R, 248/226 C, 226 D, 226 B, 210, 214, 200, 205, 281, 282, 316 R, 316 C, 359, 360, 154, 411, 186, 187, 119, 121

[56] References Cited
UNITED STATES PATENTS

| 1,032,801 | 7/1912 | Allingham | 248/282 X |
|---|---|---|---|
| 2,442,340 | 6/1948 | Buchanan et al. | 248/214 |
| 2,541,434 | 2/1951 | Nelson et al. | 248/289 X |
| 2,642,287 | 6/1953 | Rubin | 248/126 X |
| 2,939,364 | 6/1960 | Doswell et al. | 248/289 X |
| 3,111,297 | 11/1963 | Conner | 248/226 D X |
| 3,358,957 | 12/1967 | Lindenmuth | 248/226 C X |

Primary Examiner—Roy D. Frazier
Assistant Examiner—Terrell P. Lewis
Attorney, Agent, or Firm—Robert D. Sanborn

[57] ABSTRACT

A universally adjustable bracket structure for supporting a television receiver cabinet to accommodate viewing. The loop portion of a generally U-shaped bracket is provided with a swivel mount for a television receiver cabinet. A cube-shaped block is releasably retained between the leg portions of the bracket, and an adjustable clamp is mounted on the block for clamping of the bracket on ledge support structure that extends horizontally or vertically. Appropriate disposition of the clamp, in accommodation of viewing, is afforded by adjustability of the cube relative to the U-shaped bracket, or of portions of the clamp relative to the block.

6 Claims, 7 Drawing Figures

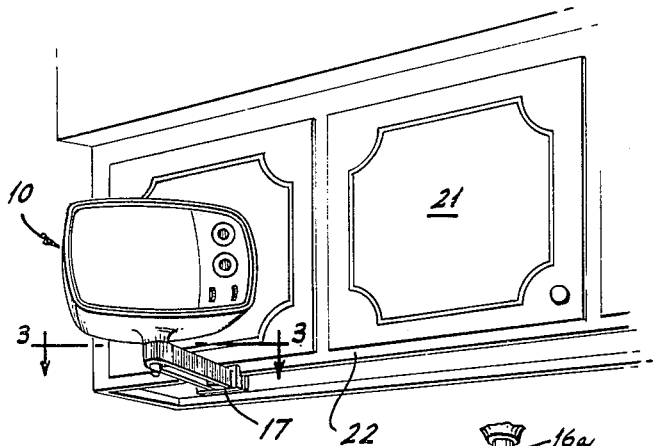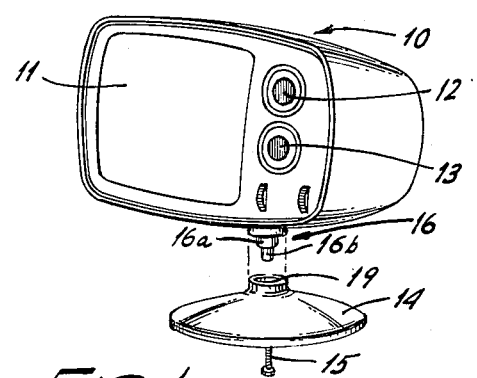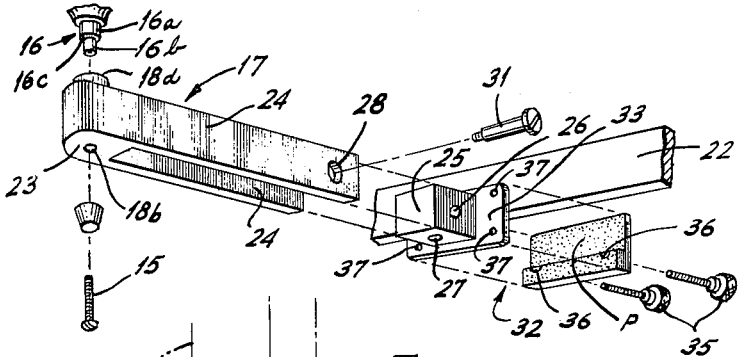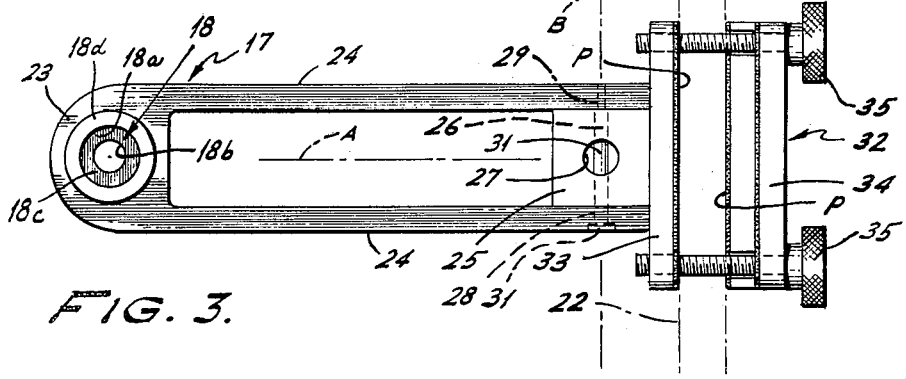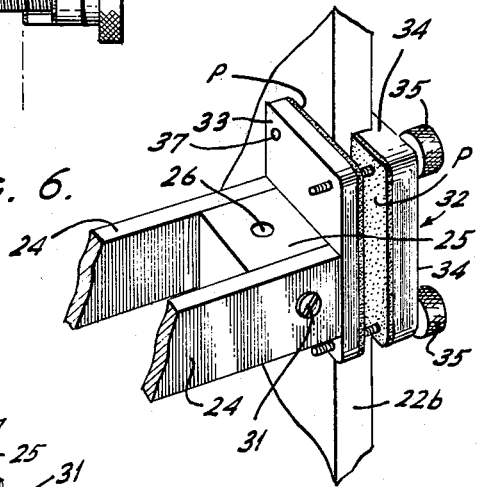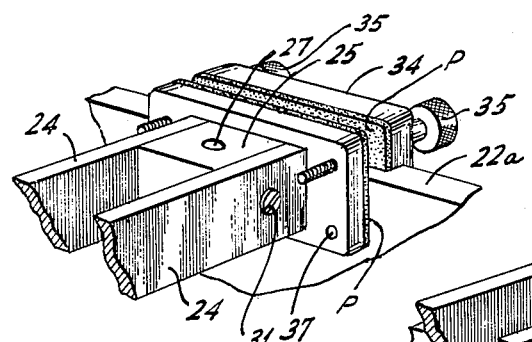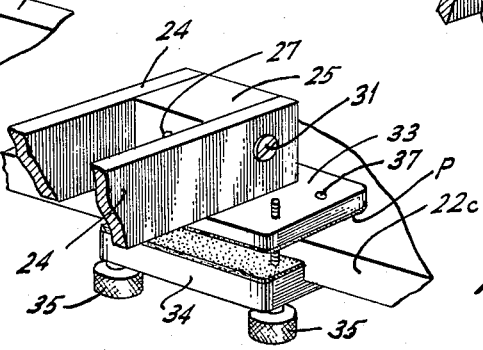

CABINET SUPPORT STRUCTURE

BACKGROUND OF THE INVENTION

This invention relates to cabinet support structure, and more particularly to adjustable bracket structure for supporting portable television receiver cabinets and the like.

It is often desired to use transistorized, portable television receiver cabinets in somewhat confined spaces, such as kitchens, boat cabins, trailer homes, or the like, where both table and floor space is at a premium. Brackets have been provided for mounting receiver cabinets in such spaces on walls, tables, or the like, but brackets for this purpose typically use needed space or require permanent mounting, and often detract from the appearance of the surroundings.

It is an objective of the invention to provide improved, versatile clamping bracket means for supporting relatively small, portable television receiver cabinets.

It is further objective of the invention to provide bracket means of the aforementioned type which utilizes space efficiently, and does not require permanent mounting.

SUMMARY OF THE INVENTION

In achievement of the foregoing as well as other objectives, the invention contemplates provision of mounting bracket means for a television receiver cabinet or the like, which bracket means comprises a U-shaped main body portion having a swivel mount for a receiver cabinet in the region of the loop portion. Confronting surfaces of the leg portions are planar, and a cube-shaped block is releasably retained between such surfaces. An adjustable clamp on the block extends across ends of the leg portions, and provides for clamping support of the receiver cabinet on structure such as a table ledge, shelf ledge, vertical post, or the like. The clamp itself is adjustable to different thicknesses of support structure, and it may be repositioned by adjustments of the cube-shaped block to accommodate support on one of the aforementioned structures, hence affording substantial universality of mounting of a receiver cabinet.

The manner in which the foregoing as well as other objectives may best be achieved will be understood from a consideration of the following description, taken in light of the accompanying drawing.

BRIEF DESCRIPTION OF THE DRAWING

FIG. 1 is a perspective showing, on a reduced scale, of a partially disassembled portable television receiver cabinet of a type with which the invention has special utility;

FIG. 2 is a perspective showing, on a further reduced scale, of the television receiver cabinet seen in FIG. 1, in combination with bracket structure embodying the invention;

FIG. 3 is a view of the bracket shown in FIG. 2, as seen looking generally in the direction of arrows 3—3 applied to FIG. 2;

FIG. 4 is an exploded view, in perspective, of the bracket shown in FIGS. 3 and 4 including a portion of the television receiver cabinet associated therewith; and FIGS. 5, 6, and 7 are perspective showings of several bracket and support structure combinations contemplated by the invention.

DETAILED DESCRIPTION OF THE PREFERRED EMBODIMENT

With more detailed reference to the drawing, there is seen in FIG. 1 a television receiver cabinet 10 of portable type to which the invention is particularly directed. Cabinet 10, which is shown partially disassembled for convenience of illustration, includes a viewing screen 11, the usual control knobs 12 and 13, and a pedestal 14 that provides for swivel mounting of the cabinet on a horizontal surface, to facilitate viewing of the screen 11. The pedestal 14 is removably attached to the lower wall of cabinet 10 by means of a screw 15 that extends with clearance through an opening in the pedestal and is threaded into a cylindrical pin 16 extending from the lower wall into a cylindrical recess 19 in the pedestal. For reasons to be explained hereinbelow, pin 16 includes portions 16a and 16b of different diameters separated by a shoulder portion 16c (FIG. 4).

In special accordance with the invention, and with reference to FIGS. 2, 3 and 4, pedestal 14 is removable and pin 16 is insertable into cylindrical recess 18 in a U-shaped bracket 17 clamped, by way of example, to a depending ledge portion 22 of cabinet structure 21. Opening 18 is essentially a duplicate of opening 19 and, to facilitate swiveling of the cabinet while ensuring structural rigidity, includes a portion 18b of reduced diameter to receive pin portion 16b and a portion 18a of greater diameter to receive pin portion 16a. Engagement of the intervening annular ledge 18c by shoulder portion 16c of pin 16, and engagement of the upper rim 18d by a lower wall portion of cabinet 10 combine to provide load-bearing support of the cabinet on the bracket.

With more detailed reference to FIGS. 3 and 4, bracket 17 includes an enlarged loop portion 23 within which recess 18 is provided, and a pair of leg portions 24 having confronting planar surfaces. A cube-shaped block 25 is positioned between the mentioned planar surfaces, and includes a pair of bores 26 and 27. A smooth-shanked bolt 31 extends with clearance through an opening 28 in one of leg portions 24 and is threaded into the opposite leg portion at 29. As is seen also in FIGS. 3 and 4, block 25 is so positioned that the smooth shank of bolt 31 extends through bore 26, serving as a retaining pin for the block between the planar surfaces of leg portion 24. The rectangular base portion 33 of a clamp 32 is provided on a face of block 25, being perferrably, but not necessaily, formed integrally therewith. A rectangular adjustable portion 34 of clamp 32 is adjustably affixed to base portion 33 by a pair of knurled thumb screws 35, each extending with clearance through openings 36 in portion 34, and threaded into corresponding tapped openings 37 in portion 33, of which openings there are four in number.

Confronting surfaces of base portion 33 and adjustable portion 34 of clamp 32 are provided with individual friction pads P to transmit the required clamping force without marring the sufaces of the supporting ledge. The non-padded surface of base portion 33 opposite its padded surface extends transversely of, and in close adjacency to, the flat ends of leg portions 24, preventing rotation of block 25 about bolt 31 in establishing and maintaining rigidity of the bracket structure, relative to the ledge 22, in provision of support of the cabinet 10.

Considering the orientation of the bracket elements in FIGS. 2, 3 and 4 to be a basic arrangement, some of the arrangements afforded by the bracket will be described relative thereto, each such arrangement being arrived at by removal of bolt 31, turning of block 25, and reinsertion of bolt 31. In the arrangement shown in FIG. 5, clamp 32 has been repositioned by turning block 25 through an angle of 180° about an axis A (FIG. 3) extending parallel to legs 24 and perpendicular to bores 26 and 27. Such an arrangement accommodates fastening of clamp 32 on an upwardly presented ledge 22a.

With reference to FIG. 6, clamp 32 has been repositioned by rotating block 25 through an angle of 90° about axis A (FIG. 3) to accommodate fastening of clamp 32 to a vertically extending ledge 22b.

With reference to FIG. 7, clamp 32 has been repositioned by rotating block 25 through an angle of 90° downwardly about axis B (FIG. 3) that extends perpendicularly to legs 24 and along the axis of bore 26, whereby to accommodate fastening of clamp 32 to a horizontally extending ledge 22c.

From the foregoing it will be appreciated that the invention affords improved bracket structure characterized by its versatility and efficiency of space utilization.

I claim:

1. Bracket structure for supporting a cabinet or the like, comprising: a generally U-shaped main body having a loop portion and substantially parallel leg portions having confronting, generally planar surfaces; said loop portion including an enlarged section provided with a generally cylindrical opening extending perpendicular to the longitudinal dimension of said leg portions for receiving matching cylindrical pin means provided on a cabinet for mounting thereof on said structure; means for retaining said pin means in said opening; a generally cube-shaped block releasably retained for adjustable positioning between said planar surfaces of said leg portions; and an adjustable clamp including a base portion on one face of said cube-shaped block and extending transversely of, in close adjacency to, end regions of said leg portions, said clamp further including an adjustable portion disposed in spaced confronting relationship to said base portion, said clamp being adjustably presented for cabinet-supporting engagement with suitable ledge means.

2. Bracket structure for supporting a cabinet or the like, comprising: a generally U-shaped main body having a loop portion and substantially parallel leg portions having confronting, generally planar surfaces, means for mounting a cabinet on said loop portion; a generally cube-shaped block releasably retained for adjustable positioning between said planar surfaces of said leg portions; and an adjustable clamp including a base portion formed integrally with said block on one face of said cube-shaped block and extending transversely of, in close adjacency to, end regions of said leg portions, said clamp further including an adjustable portion disposed in spaced confronting relationship to said base portion, said clamp being adjustably presented for cabinet-supporting engagement with suitable ledge means.

3. Bracket structure for supporting a cabinet or the like, comprising: a generally U-shaped main body having a loop portion and substantially parallel leg portions having confronting, generally planar surfaces; means for mounting a cabinet on said loop portion; a generally cube-shaped block releasably retained for adjustable positioning between said planar surfaces of said leg portions; each leg portion being provided with an aperture in the region of said planar portion which is aligned with the aperture in the opposite leg portion, said block being formed with a first bore extending therethrough in alignment with said apertures in said leg portions, said block being formed with a second bore extending through an adjacent pair of opposed block faces and perpendicular to said first bore in said block, a removable, block-retaining pin means extending through said first bore in said block and into said apertures in said leg portions; and an adjustable clamp including a base portion on one face of said cube-shaped block and extending transversely of, in close adjacency to, end regions of said leg portions, said clamp further including an adjustable portion disposed in spaced confronting relationship to said base portion, said clamp being adjustably presented for cabinet-supporting engagement with suitable ledge means, said removable pin means, said bores and said apertures, said block and said planar surfaces being so cooperably disposed that removal of said pin accommodates repositioning of said block to align said second bore with said aperture for reinsertion of said pin means, whereby to reposition said adjustable clamp.

4. The combination according to claim 3 wherein the ends of said leg portions abut said base portion, thereby to prevent rotation of said leg portions about said pin means.

5. Bracket structure according to claim 3, and characterized in that said loop portion includes: an enlarged section provided with a generally cylindrical opening extending perpendicular to the longitudinal dimension of said leg portions for receiving matching cylindrical pin means provided on a cabinet for the mounting thereof; and means for retaining said pin means in said opening.

6. Bracket structure according to claim 5, and characterized in that said clamp base portion in formed integrally with said block.

* * * * *